US007991686B1

(12) United States Patent
Stevens et al.

(10) Patent No.: US 7,991,686 B1
(45) Date of Patent: *Aug. 2, 2011

(54) COMPUTER SYSTEM FOR AN AUCTION EXCHANGE FOR FINANCIALLY SETTLED CONTRACTS

(75) Inventors: Andrew J. Stevens, Bethesda, MD (US); Matthew R. Tate, Bethesda, MD (US); Mark A. Bulkeley, Great Falls, VA (US); Dean L. Wilde, II, McLean, VA (US); Paul S. Gibbs, Arlington, VA (US); Stefan Jacob, Berkeley, CA (US)

(73) Assignee: DC Energy LLC, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/479,432

(22) Filed: Jun. 5, 2009

Related U.S. Application Data

(63) Continuation-in-part of application No. 11/986,091, filed on Nov. 20, 2007, now Pat. No. 7,676,424.

(51) Int. Cl.
*G06Q 40/00* (2006.01)
(52) U.S. Cl. ........................................ 705/37
(58) Field of Classification Search ............... 705/37, 705/36, 1, 36 R; 283/67
See application file for complete search history.

(56) References Cited

U.S. PATENT DOCUMENTS

| | | | | |
|---|---|---|---|---|
| 5,803,500 | A * | 9/1998 | Mossberg | 283/67 |
| 6,115,698 | A * | 9/2000 | Tuck et al. | 705/37 |
| 6,321,212 | B1 | 11/2001 | Lange | |
| 6,377,940 | B2 | 4/2002 | Tilfors et al. | |
| 6,405,180 | B2 * | 6/2002 | Tilfors et al. | 705/36 R |
| 6,421,653 | B1 | 7/2002 | May | |
| 6,618,707 | B1 | 9/2003 | Gary | |
| 6,751,597 | B1 | 6/2004 | Brodsky et al. | |
| 6,775,597 | B1 | 8/2004 | Ristanovic et al. | |
| 6,909,941 | B2 | 6/2005 | Scott et al. | |
| 7,039,610 | B2 | 5/2006 | Morano et al. | |

(Continued)

OTHER PUBLICATIONS

Saavedra, Osvaldo R. and Unsihuay, Clodomiro. Comparative Studies on Transmission Loss Allocation Methods for Competitive Electricity Markets. 2003 IEEE Bologna PowerTech Conference. (Jun. 23-26, 2003. Bologna, Italy).*

(Continued)

*Primary Examiner* — Olabode Akintola
*Assistant Examiner* — John O Preston
(74) *Attorney, Agent, or Firm* — Stephen C. Glazier; K&L Gates LLP

(57) ABSTRACT

Various embodiments show a system for conducting an auction for a plurality of financially settled contracts: The system may comprise at least one computer. The at least one computer may be programmed to receive a plurality of first participant bids from a first participant and a plurality of second participant bids from a second participant. The at least one computer may also be programmed to match a batch of bids, where the matched bids may be modified to reduce the trade risk of a portfolio of the first participant, or to liquidate a defaulted portfolio subject to a Maximum Portfolio Liquidation Cost Constraint. The contracts may include, for example, an oil contract, a coal contract, a natural gas contract, an electricity contract, a weather contract, a weather-related events contract, a commodities contract, a location specific service contract (e.g., a passenger contract and/or freight contract), a financial derivative contract, or a credit default contract on any of an entity's issued securities.

35 Claims, 7 Drawing Sheets

U.S. PATENT DOCUMENTS

| | | | |
|---|---|---|---|
| 7,085,739 B1 | 8/2006 | Winter et al. | |
| 7,124,106 B1 | 10/2006 | Stallaert et al. | |
| 7,162,447 B1 | 1/2007 | Cushing | |
| 7,243,083 B2 | 7/2007 | Burns et al. | |
| 7,246,093 B1 | 7/2007 | Katz | |
| 7,702,563 B2 | 4/2010 | Balson et al. | |
| 7,873,564 B1 | 1/2011 | Stevens et al. | |
| 2002/0055901 A1* | 5/2002 | Gianakouros et al. | 705/37 |
| 2003/0004852 A1* | 1/2003 | Burns | 705/37 |
| 2003/0028476 A1* | 2/2003 | Jenkins et al. | 705/37 |
| 2003/0041002 A1 | 2/2003 | Hao et al. | |
| 2003/0101123 A1* | 5/2003 | Alvarado et al. | 705/36 |
| 2004/0010478 A1 | 1/2004 | Peljto et al. | |
| 2005/0273341 A1* | 12/2005 | Hoffesommer | 705/1 |
| 2009/0132408 A1 | 5/2009 | Stevens et al. | |
| 2010/0121760 A1 | 5/2010 | Stevens | |

OTHER PUBLICATIONS

Natural Gas Week. Exchanges OK Deal on Contracts; Could Hasten Open Outcry Demise. New York: Apr. 7, 2006. p. 1.*

Middle East Company News. First Energy Contract Starts Trading on DGCX today. Dubai: Oct. 30, 2006. p. 1.*

Xinhua News Agency—CEIA. Online Energy Trading Expected to Swell, Says Report. Woodside: Apr. 10, 2001. p. 1.*

Exchanges OK Deal on Contracts, Could Hasten Open Outcry Demise, Natural Gas Week, New York, Apr. 7, 2006, 2 pages.

1st Energy Contract Starts Trading on DGCX Today, Middle East Company News, Dubai, Oct. 30, 2006, 2 pages.

Online Energy Trading Expected to Swell, Says Report, Xinhua News Agency—CEIS, Woodside, Apr. 10, 2001, 2 pages.

Notice of Allowance dated Nov. 17, 2009 in U.S. Appl. No. 11/986,091.

U.S. Appl. No. 12/396,926, filed Mar. 3, 2009.

U.S. Appl. No. 12/542,151, filed Aug. 17, 2009.

Clodomiro Unsihuay and Osvaldo R. Saavedra, "Comparative Studies on Transmission Loss Allocation Methods for Competitive Electricity Markets," 2003 IEEE Bologna PowerTech Conference, Jun. 23-26, 2003, Bologna, Italy, 7 pages.

"About ISE Alternative Markets," International Securities Exchange, printed from http://www.ise.com/WebForm/viewPage.aspx?categoryId=112&header2=true&menu0=true on Oct. 30, 2007.

"Longitude Technology," International Securities Exchange, printed from http://www.ise.com/WebForm/viewPage.aspx?categoryId=341&header2=true&menu1=true on Oct. 30, 2007.

"Longitude Mathematics," International Securities Exchange, printed from http://www.ise.com/WebForm/viewPage.aspx?categoryId=342&header2=true&menu2=true on Oct. 30, 2007.

"The Mathematical Principles of Longitude," International Securities Exchange, printed from http://www.ise.com/WebForm/viewPage.aspx?categoryId=342&header2=true&menu2=true on Oct. 30, 2007.

Bushnell, James, "Transmission Rights and Market Power," Discussion draft, Oct. 1998, downloaded from: http://faculty-gsb.stanford.edu/wilson/archive/E542/classfiles/trans_rights2.pdf on Nov. 20, 2007.

Liu, Leslie & Zobian, Assef, "The Importance of Marginal Loss Pricing in an RTO Environment" downloaded from http://www.ces-us.com/download/Losses%20paper%20-%20web.pdf on Nov. 20, 2007.

Office Action dated Sep. 3, 2008 in U.S. Appl. No. 11/986,091.

Office Action dated Mar. 23, 2009 in U.S. Appl. No. 11/986,091.

Office Action dated Oct. 27, 2009 in U.S. Appl. No. 12/396,926.

Notice of Allowability dated Sep. 27, 2010 in U.S. Appl. No. 12/396,926.

Notice of Allowance dated Nov. 5, 2010 in U.S. Appl. No. 12/396,926.

Office Action dated Dec. 23, 2010 in U.S. Appl. No. 12/542,151.

Office Action dated Sep. 3, 2010 in U.S. Appl. No. 12/692,207.

Notice of Allowance dated Dec. 21, 2010 in U.S. Appl. No. 12/692,207.

Bushnell, James, "Transmission Rights and Market Power," Apr. 1999, University of California Energy Institute, 15 pages.

Notice of Allowance dated Jul. 23, 2010 in U.S. Appl. No. 12/396,926.

Office Action dated Jun. 21, 2010 in U.S. Appl. No. 12/542,151.

* cited by examiner

COMPUTER SYSTEM FOR AN AUCTION EXCHANGE FOR FINANCIALLY SETTLED CONTRACTS

CROSS-REFERENCE TO RELATED APPLICATIONS

This application is a continuation-in-part of U.S. patent application Ser. No. 11/986,091 filed on Nov. 20, 2007 now U.S. Pat. No. 7,676,424, which is incorporated herein by reference in its entirety.

FIELD OF THE INVENTION

Embodiments of the invention generally relate to methods and systems for facilitating, performing and/or participating in auctions of financially settled contracts.

BACKGROUND

The present disclosure relates to auctions for financially settled contracts. Financially settled contracts are traded over-the-counter and on various exchanges including, for example, some forward commodities exchanges. Participants trade financially settled contracts outright and may also trade spreads and strips of financially settled contracts. A spread includes a short position in a first contract and a long position in a second contract, equating to a position that settles on a difference in price between the two contracts. A strip includes like positions (e.g., long or short) in two contracts over consecutive settlement periods. Advancements are needed in the trading of financially settled contracts to improve liquidity, volume and other factors.

FIGURES

Embodiments of the present invention are described herein, by way of example, in conjunction with the following figures, wherein.

Figure 1:
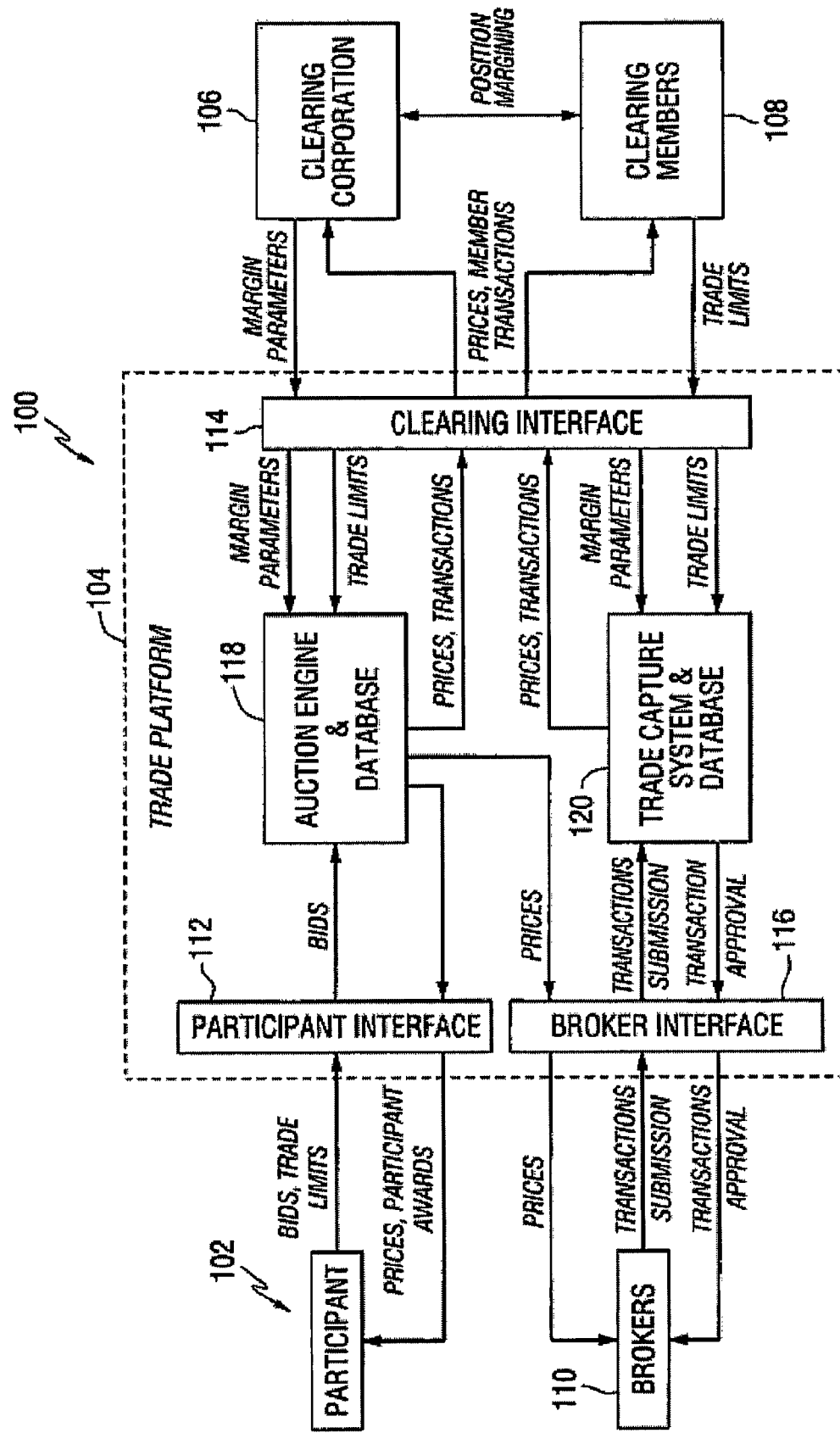
FIG. 1 illustrates one embodiment of a computer system architecture for facilitating an auction exchange for financially settled contracts.
Figure 8:
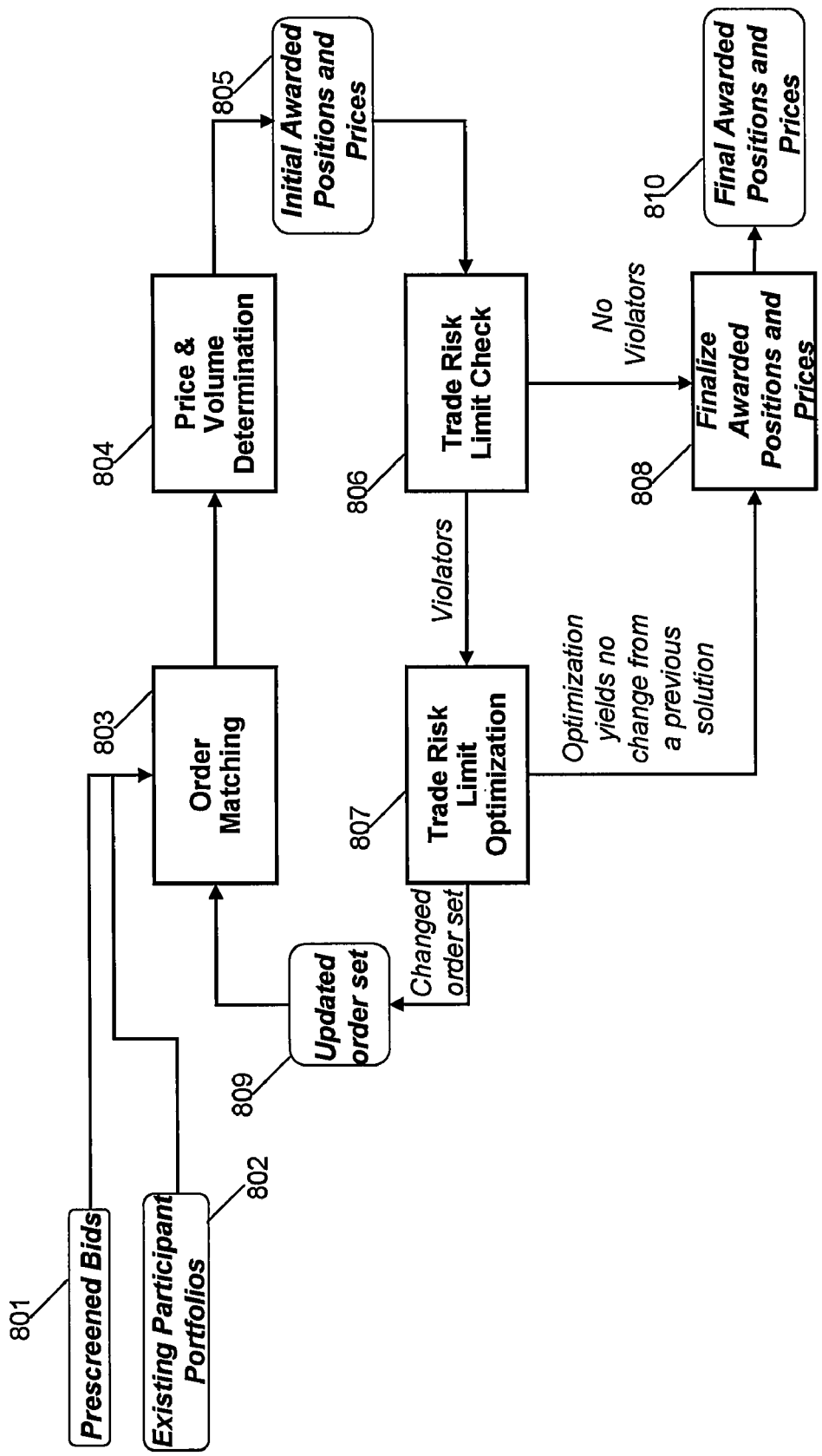
Figure 9:
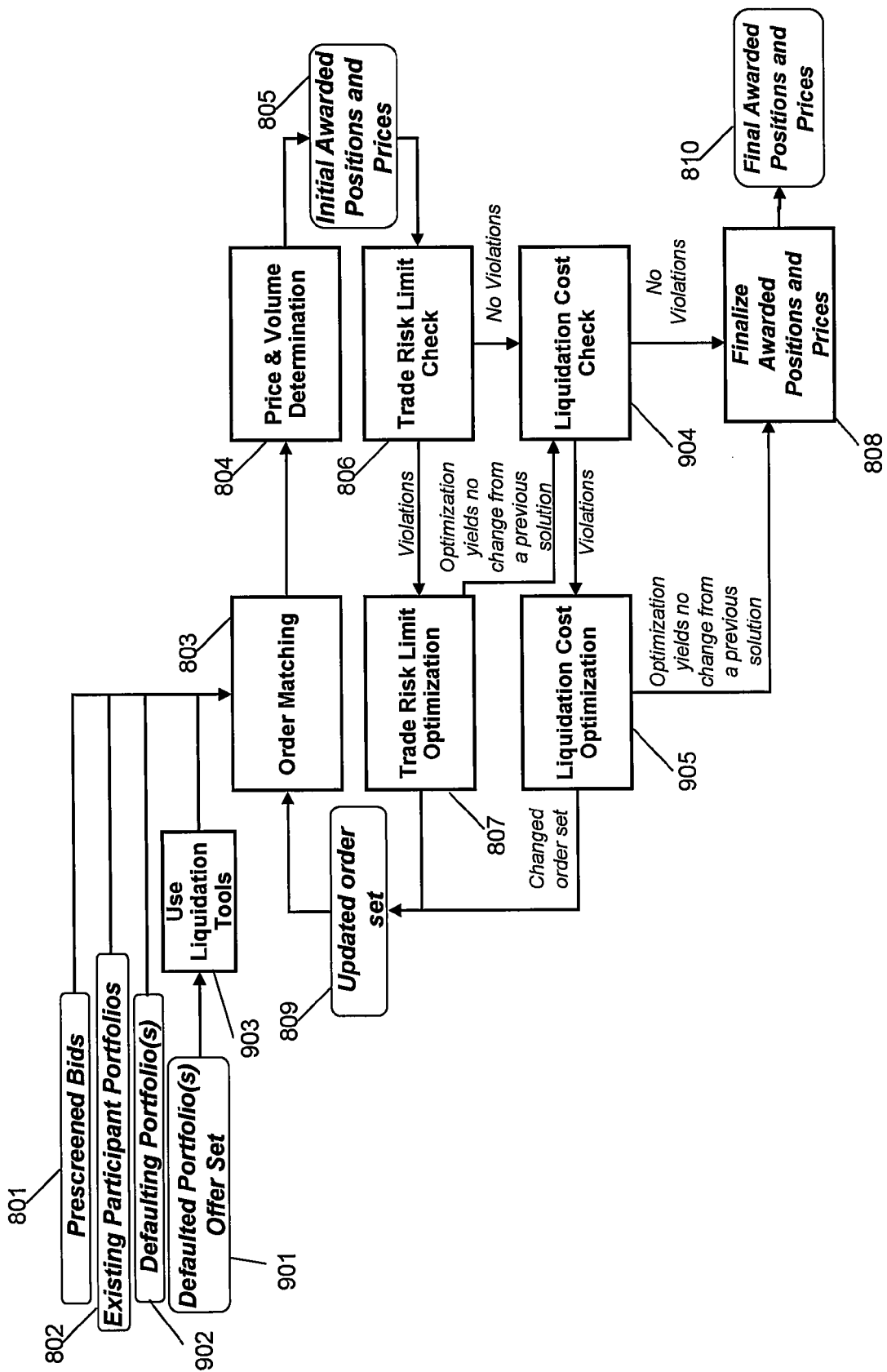

FIG. 8 illustrates one embodiment of a process flow for implementing an auction of financially settled contracts utilizing the architecture shown in FIG. 1 including orderly reduction of participant exposure; and FIG. 9 illustrates one embodiment of a process flow for implementing an auction of financially settled contracts utilizing the architecture shown in FIG. 1 including orderly liquidation of a defaulted portfolio.

DESCRIPTION

In one general aspect, embodiments of the present invention may be directed to a computer system for conducting an auction exchange for a plurality of financially settled contracts. The system may comprise at least one computer. The at least one computer may be programmed to receive a plurality of first participant bids from a first participant and a plurality of second participant bids from a second participant. The at least one computer may also be programmed to match a batch of bids to create a plurality of awarded bids. The batch of bids may comprise the plurality of first participant bids and the plurality of second participant bids. Each bid of the batch of bids may relate to at least a portion of the plurality of financially settled contracts. The first participant may have a portfolio, and if the portfolio has a trade risk in violation of a trade risk limit, the plurality of awarded bids may be modified to award the first participant bids that reduce or do not increase the trade risk of portfolio. Also, the matching may comprise matching an outright bid with at least one leg of at least one non-outright bid.

Other embodiments of the present invention may be directed to a computer system for conducting an auction exchange for a plurality of financially settled contracts. The system may comprise at least one computer. The at least one computer may be programmed to receive a plurality of first participant bids from a first participant and a plurality of second participant bids from a second participant. The at least one computer may also be programmed to match a batch of bids to create a plurality of awarded bids. The batch of bids may comprise the plurality of first participant bids and the plurality of second participant bids. Each bid of the batch of bids may relate to at least a portion of the plurality of financially settled contracts. The first participant may have a portfolio, and if the portfolio has a trade risk in violation of a trade risk limit, the plurality of awarded bids may be modified to award the first participant bids that reduce or do not increase the trade risk of the portfolio. At least a portion of the plurality of financially settled contracts may be in a defaulted portfolio. The plurality of awarded bids may be modified to liquidate the defaulted portfolio for a liquidation cost less than or equal to a Maximum Portfolio Liquidation Cost Constraint. Also, the matching may comprise matching an outright bid with at least one leg of at least one non-outright bid.

FIG. 1

FIG. 1 illustrates one embodiment of a computer system architecture 100 for facilitating an auction exchange for financially settled contracts. The financially settled contracts may be contracts that are settled in cash rather than by delivery of a commodity. The financially settled contracts may include, for example, contracts that settle on the price of an underlying value, such as a commodity, security, index, or other value over a specified settlement period. The auction architecture 100 may comprise a trade platform 104 configured to conduct the auctions. The trade platform 104 may include an auction engine 118 for conducting various auctions by matching bids, for example, as described below. Optionally, the trade platform 104 may also be configured to work in conjunction with brokers 110. For example, the trade platform 104 may comprise a trade capture system 120 to aid in the execution of broker-facilitated trades. Broker-facilitated trades may allow trade platform participants 102 to make and fill bids outside of the auction process. This may be useful, for example, for participants 102 who wish to trade a position in between auctions, or for participants 102 whose bids in an auction were not awarded.

The trade platform 104 may be in communication with various other parties. For example, the one or more participants 102 may submit auction bids, auction constraints, broker bids, and the like, to the trade platform 104. Participants 102 may also receive positions awarded as a result of the auctions or broker transactions. A clearing corporation 106 or other clearing party may provide additional auction constraints and may clear awarded bids generated by the trade platform 104 in the various auctions as well as awarded bids cleared in broker transactions. Clearing members 108 for the participants 102 may handle various matters related to the clearing of winning bid pairs and may also provide auction constraints.

The trade platform 104 may also include various interfaces 112, 114, 116 for facilitating communication with other parties of the architecture 100. For example, a participant interface 112 may handle communications with the various participants 102. A broker interface 116 may handle communications with the various brokers 110. Also, a clearing interface 114 may handle communications with the clearing corporation 106 and clearing members 108. The various components 112, 114, 116, 118, 120 of the platform 104 may be implemented according to any suitable hardware and/or software methods. For example, the components 112, 114, 116, 118, 120 may comprise various software modules executed by the processor or processors of one or more servers or other computing devices.

The trade platform 104 may be configured to handle bids and auctions for any kind of financially settled contracts. According to various embodiments, however, the trade platform 104 may be configured to support auctions for contracts that settle on locationally depending underlying values, such as some energy-related contracts, or for contracts that settle financially, based on events or securities prices at a highly granular level. For example, locational energy-related contracts may include oil contracts; coal contracts; natural gas contracts; and electricity contracts; weather contracts; weather-related events contracts; location-specific services contracts (e.g., a passenger contracts; freight contracts), and the like. Financially settled contracts on events or security prices may include financial derivatives or credit default swaps on any of an entity's issued securities. Also, according to various embodiments, the trade platform 104 may be configured to support auctions that include other commodities (e.g., agricultural commodities, raw materials, and the like) and events or properties that may affect the prices of the other commodities.

FIG. 2

Figure 2:
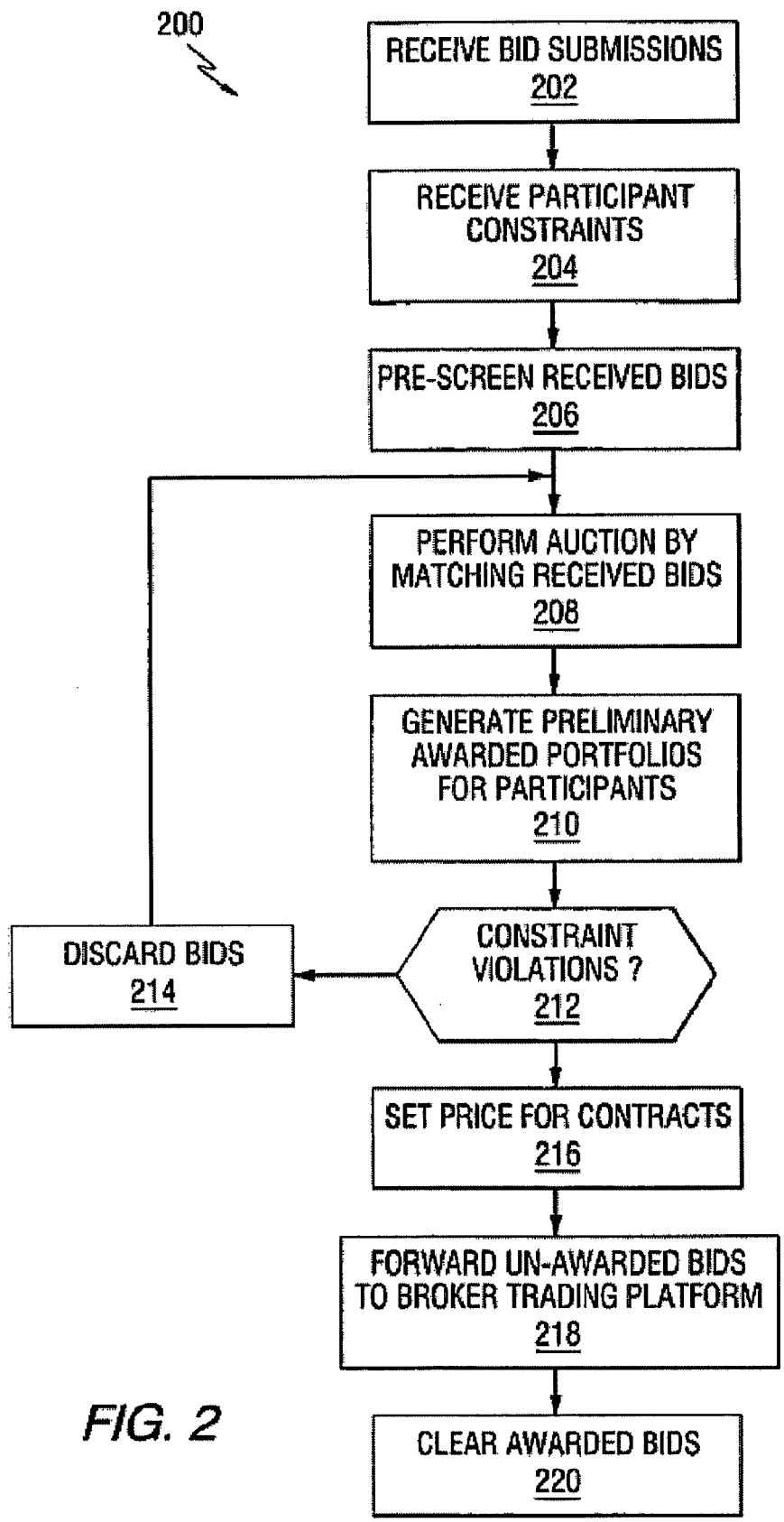
FIG. 2 illustrates one embodiment of a process flow for implementing an auction of financially settled contracts utilizing the architecture shown in FIG. 1.

FIG. 2 illustrates one embodiment of a process flow 200 for implementing an auction for financially settled contracts, for example, utilizing the architecture 100 shown in FIG. 1. At box 202, the trade platform 104 may receive bid submissions from participants 102 for an auction. Bid submissions for any given auction may be received over a predetermined bid submission period, (e.g., one day prior to the auction, one week prior to the auction, and the like). Each bid submission may comprise one or more bids for positions on financially settled contracts to be considered in the auction. Participants 102 may submit all of their bids for the auction at the same time, or may make multiple submissions. When a participant 102 submits more than one bid, the participant may have the option to prioritize their bids. The auction engine 118 may utilize the priorities, as described below, if it becomes necessary to discard one or more bids. The set of all bids submitted for a given auction may be referred to as a batch.

Bids may include outright bids for a contract and/or non-outright bids. An outright bid may be a bid for a position having a one-to-one correlation with a contract. An outright bid may comprise an indication of a contract (e.g., a commodity code, location code and settlement period), a quantity, a price, a commodity type, and an indication of whether the bid is for a long or short position on the contract. A non-outright bid may be a bid for a position that does not have a one-to-one correlation to a contract. For example, some non-outright bids may have multiple legs, where each leg represents a position (e.g., long or short) in a particular contract. Some non-outright bids may include one or more legs representing a single position that is less than all of a contract (e.g., over a smaller period than the tenor of the contract). Spread bids and strip bids may be non-outright bids. Accordingly, a non-outright bid may comprise an indication of each contract corresponding to a leg of the non-outright bid. The indication may include, for example, quantity, price, settlement period, and contract code, as well as an indication of which leg or legs are short and which leg or legs are long. According to various embodiments, non-outright bids may be permitted to include any combination of long and short legs.

The trade platform 104 may be configured to support outright and non-outright bids across an arbitrary number of dimensions. A non-outright bid may be a bid that does not have a one-to-one correlation to a particular contract. A non-outright bid may include positions in multiple contracts, or a position having a nominal value that is not an integer multiple of the nominal value of the underlying contract. For example, non-outright bids may include any combination of legs for positions in contracts settling on any combination or combinations of underlying values, quantities and/or settlement periods. One example non-outright bid may comprise a long position on a contract for a first underlying (e.g., the price of a commodity at a first location) settling over a first time period and a short position on a contract for a second underlying (e.g., the price of the same or a different commodity at a second location) settling over a second time period. Non-outright bids may also match un-like numbers of positions. In the context of an electricity forward contract exchange, an example non-outright bid may include a long position on a quantity of power generated over a first settlement period at four nodes and a corresponding short position on power delivered at three other nodes over the first settlement period.

Another example non-outright bid is a spread-of-spreads bid. A spread-of-spreads bid may a bid valuing a spread between a first spread and a second spread. For example, the first spread may be between contracts settling over two different commodities over a first time period. The second spread may be between contracts settling over the same two commodities over a second time period. Another example non-outright bid may be a non-contiguous multi-period bid. A first leg or legs of such a bid may settle on a first contract or contracts over a first settlement period and a second leg or legs may settle on the first contract over a second settlement period that is not contiguous to the first. Yet another example non-outright bid is a proportional bid. In a proportional bid, one or more legs may be based on the price of an underlying contract multiplied by a proportionality constant. An example proportional bid may be a locational electricity contract paired with a proportional amount of locational gas contracts with a proportionality constant equal to the conversion efficiency of a gas turbine generation plant. In this example, the awarded proportional bid may act as a direct financial hedge to the operating costs and revenues of a gas turbine generation plant.

According to various embodiments, the auction engine 118 may be configured to derive a position or combination of contract positions that are equivalent to the position represented by each participant bid. For example, positions in some contract types may be expressed synthetically in terms of other contracts. This may allow the auction engine 118 to match a bid or bid leg on one type of contract with a corresponding bid or bid legs on another type of contract. For example, as described below, an electricity loss contract may be expressed as a spread between an electricity price contract and an appropriate congestion contract. According to various embodiments, a participant need only bid for a position and need not specify a particular contract or contracts. Also, if the position of a participant's bid may be represented by more than one combination of contract positions, the auction engine 118 may be configured to substitute equivalent positions in order to derive an optimal solution.

At box 204, the trade engine 104 may receive participant constraints. For example, participant constraints may include collateral limits and trade limits. A collateral limit for some or all of the participants may be received from the clearing corporation 106 or other clearing party. A collateral limit, or margin parameter, may be a limit on the positions that a particular participant is permitted to hold based on the amount of collateral that the participant has posted or has available to post. According to various embodiments, awarded bids and other transactions may be novated by the clearing corporation 106, as described below. This makes the clearing corporation 106 the counter party to both sides of each transaction, causing the clearing corporation 106 to bear the risk of participant defaults. To mitigate this risk the clearing corporation 106 may require participants to back up their positions with collateral. The amount of collateral required for a given position (e.g., a collateral limit or margin) may be set for a participant 102 based on the risk of the participant's portfolio, the historical volatility of the portfolio, correlations among the contracts comprising the portfolio, and the risk tolerance of the clearing corporation 106 with respect to the participant 102. In one embodiment, the collateral limit for a given participant may be provided to the trade platform 104 by a general clearing member (GCM) responsible for clearing transactions for the participant 102 and may stay in effect until revoked or revised by the GCM.

A trading limit for a particular participant 102 may be used to constrain the trading activities of the participant 102. A trading limit may represent the maximum trading activity that a participant 102 may undertake in a single period (e.g., a day a month, and the like). The trading limit may be expressed, for example, as a number of trades or a volume. The trading limit for any given participant 102 may be set by the participant 102, by the trade platform 104 or by clearing corporation 106 or the GCM responsible for the participant 102.

According to various embodiments, the bids received from each participant 102 may be pre-screened, at box 206. Pre-screening a bid may comprise generating a list of unique contracts for which each participant 102 has submitted bids. For example, each outright bid may have one associated contract. Some non-outright bids, (e.g., those having multiple legs), may have more than one associated contract. Prescreening may also involve creating a pre-screening file for each participant 102. The pre-screening file may include any parameters that are necessary to calculate collateral requirements for various positions in associated contracts. Such parameters may include, for example, an initial margin for each contract and inter-commodity spread credits. An initial margin for a contract may represent an amount of collateral required for an outright position in the contract. An inter-commodity spread credit may represent reduction in collateral (e.g., a percentage) that is awarded for offsetting positions (e.g., long and short) in two separate but correlated contracts. The pre-screening file may typically include less than the entire set of parameters describing the market. This may allow the auction engine 118 to calculate the collateral required for a participant's positions without the need to process the full set of market parameters.

At step 208, the trade platform 104 (e.g., the auction engine 118) may perform the auction by matching corresponding bids within the batch. According to various embodiments, the matching may be co-optimized for outright bids and non-outright bids (e.g., any kind of offsetting positions may be matched). For example, each leg of a non-outright bid may be treated as an outright bid and may be matched with any offsetting position including, for example, an offsetting outright bid and/or an offsetting leg or combination of legs from other non-outright bids. Likewise an outright bid may be matched with an offsetting outright bid, or with any combination of non-outright bid legs. Also, according to various embodiments, contracts of different tenors or settlement periods may be matched. For example, a bid for a contract having a tenor longer than a pre-determined tenor may be expressed as a bid for an equivalent bundle of contracts having the pre-determined tenor. Such a bid may be matched with: other bids for the same bundled contract; some combination of offsetting bids for pre-determined tenor contracts; and/or some portion of a bid for other bundled contracts.

According to various embodiments, the set of bids to be considered for any given contract may include all outright bids for the contract as well as all legs of non-outright bids that can be expressed in terms of a position in all or a portion of the contract. In some embodiments, the auction engine 118 may be configured to avoid partially awarding a bid. For example, the auction engine 118 may not match any of the legs of a non-outright bid unless it is able to match all of the legs of the non-outright bid. In this way, participants may be able to construct bids for complex positions without assuming the risk that less than all of the position will be awarded. Also, in various embodiments, the total awarded positions in each contract may be set equal to zero (e.g., the volume of matched or awarded long positions in any given contract may be equal the volume of awarded short positions). This may be referred to as a zero-capacity constraint.

Several examples of positions that may be matched are now provided. In a first example, a first participant may place an outright bid for a long position in 1000 cubic feet of natural gas at location A over a first settlement period. A second participant may place an outright bid for a short position in 1000 cubic feet of natural gas at location B over the same settlement period. A third participant may place a non-outright bid for a position in 1000 cubic feet from location A to location B over the same settlement period. The short leg of the non-outright bid (e.g., 1000 cubic feet at location A) may be matched with the first participant's bid, while the long leg of the non-outright bid (e.g., 1000 cubic feet at location B) may be matched with the second participant's bid. In another example, a first participant may make a non-outright bid for a long position in a commodity contract with a tenor of three months. Three other participants may bid for short positions in the commodity, with one short position corresponding to each of the three months covered by the first participant's bid. The first participant's bid may be matched with the bids of the three other participants.

According to various embodiments, the batch of bids may be matched to optimize an auction variable. For example, in some embodiments, the auction engine 118 may solve for the combination of bids that maximizes auction revenue. Auction revenue may be the total notional value of all awarded bids.

Also, in some embodiments, the auction engine 118 may solve for the combination of bids that maximizes transaction volume, and therefore promotes liquidity. A combination of auction revenue and transaction volume may also be optimized. In an alternative embodiment, the auction engine 118 may solve for the combination of bids that maximizes economic surplus.

At box 210, the auction engine 118 may create a preliminary awarded portfolio for each participant 102 based on the results of the matching at step 208. A preliminary awarded portfolio may represent all of a participant's bids that were successfully matched to other positions according to the constraints of the auction. At box 212, the auction engine 118 may determine whether any of the preliminary awarded portfolios violate the corresponding participant constraints. For example, a participant's preliminary awarded portfolio may violate a participant constraint if it causes the participant to take a position that is in excess of that participant's trade limit, or would require collateral in excess of the participant's collateral limit. The pre-screening file derived at box 206 may be utilized to streamline the process of determining the collateral required for the preliminary awarded portfolio.

For any preliminary awarded portfolios that violate participant constraints, the auction engine 118 may discard a subset of bids from the portfolio at step 214 such that the bids remaining in the portfolio do not exceed the participant constraint. If the participant has submitted bid priorities, then the bids given the lowest priority by the participant may be discarded first. According to various embodiments, if the participant has failed to provide bid priorities, then bids may be successively discarded in ascending order of positive impact on the participant's economic surplus, with the bid whose presence in the portfolio has the least positive (or most negative) impact discarded first until the participant constraints are met. After bids are discarded, the auction process may be repeated at box 208, generating new preliminary awarded portfolios for each participant. This process may continue iteratively until all awarded portfolios meet their corresponding participant constraints. According to various embodiments, the auction engine 118 may be programmed to optimize the matching of bids to meet participant constraints on the first iteration, making it unnecessary to recalculate the awarded portfolios multiple times.

At box 216, the auction engine 118 may set a price for each contract for which bids were entertained. Contracts having awarded bids, or awarded bids on equivalent positions, may be set to the price of the awarded bids. Not all contracts, however, may have awarded bids. Contracts without awarded bids may be priced according to any suitable manner. For example, if a contract has a lowest received short bid that exceeds the highest received long bid, the price may be set at the midpoint of the lowest short bid and the highest long bid. Also, some contracts may have no awarded positions despite having a highest long bid that exceeds the lowest short bid. For example, the optimal auction solution may not have included any possible transactions for these contracts. The price of such contracts may be set to the intersection of long and short bids (e.g., the intersection of supply and demand). Still other contracts may have received no bids. For these contracts, prices may be extrapolated from the clearing prices of other contracts in the auction, for example, based on historical price correlations. In various embodiments, a percent change in the price of a first contract or contracts in the current auction from the previous auction may be applied to other contracts which are highly correlated to the first contract or contracts. For example, given two highly correlated contracts A and B, if contract A increased in price by 5% in a current auction, while there were no bids for contract, B, then the price of contract B may be set to a value 5% higher than its previous prices.

At box 218, some or all of the un-awarded bids from the auction may be forwarded to a broker trading platform comprising the trade capture system 120. According to various embodiments, participants may choose whether their un-awarded bids are forwarded to brokers 110 or discarded. Authorized brokers 110 may access the trade platform 104 to view un-awarded bids, as well as any other non-auction bids submitted to a broker 110 or to the trade platform 103. Brokers 110 may then solicit counter-parties for the bids. If a counter party is found, the transaction may be forwarded to the trade capture system 120, which may facilitate the transaction. For example, the trade capture system 120 may verify that the broker 110 is authorized to transact on the trade platform 104; verify that the participant 102 is authorized to transact on the trade platform 104; and/or verify that the transaction would not violate a participant constraint, such as a collateral constraint or a trade limit. Provided that the transaction is properly authorized, it may be forwarded to the clearing corporation 106. It will be appreciated that the brokers 110 may also receive other bids outside of the auction process. For example, auctions may be held periodically (e.g., daily, weekly, monthly). Participants who desire a transaction between auctions may submit bids to one of the brokers 110. If a counter party is found, the transaction may proceed to the trade capture system 120 as described.

Referring back to FIG. 2, awarded bids may be cleared at step 220. According to various embodiments, the clearing corporation 106, or other clearing party, may act as a counterparty to all transactions. Through a process called novation, each trade between two participants may be split into two trades, whereby the clearing corporation 106 becomes the buyer to the selling participant and the seller to the buying participant.

In embodiments where this clearing arrangement is used, the clearing corporation 106 may assume most of the credit risk inherent in the transaction. To mitigate this risk, some clearing corporations 106 may require that all positions be settled on a periodic (e.g., daily) basis, regardless of the maturity of the underlying contracts. For example, if a participant has a long position in a first contract, and the closing price of the first contract falls by $10, the clearing corporation may transfer $10 from the participant's margin account to the clearing corporation 106 to cover the position. Likewise, the clearing corporation 106 may transfer $10 to the margin accounts of any participants holding long positions in the futures contract. The prices used to determine changes in value of various contracts may be, for example, the prices found at box 216 as described above.

According to various embodiments, the trading platform 104 may generate sufficient liquidity to allow it to handle auctions for large numbers of contracts. For example, as the number of contracts considered in an auction increases, the number of outright bids for each contract decreases, bringing about a corresponding decrease in liquidity. Utilizing the systems and methods described herein, may promote liquidity. For example, matching outright bids with a leg or legs of non-outright bids may generate more matched bids per outright bid. In addition, according to various embodiments, the number of allowed non-outright bid configurations may draw more participants to the market for arbitrage and speculation opportunities, further increasing liquidity. Accordingly, in the context of a forward commodities market, (e.g., a forward electricity market) the trading platform 104 may be able to support auctions on over one hundred thousand contracts.

According to various embodiments, the trading platform 104 may be able to support auctions on more than a million contracts.

Figure 3:
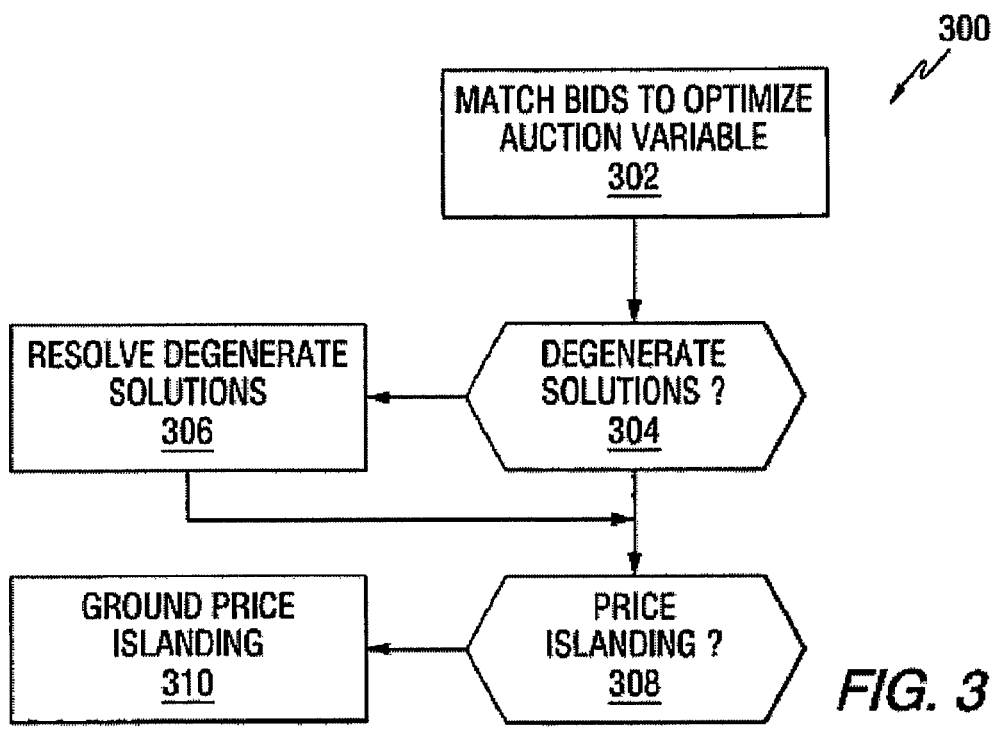
FIG. 3 illustrates one embodiment of a process flow that may be implemented by the architecture of FIG. 1 to match and award bids selected from a batch.

FIG. 3 illustrates one embodiment of a process flow 300 that may be implemented by the auction engine 118 of the trading platform 104 to match and award bids selected from a batch. At box 302, the auction engine 118 may match bids from the batch to optimize the auction variable or variables (e.g., auction revenue and/or auction volume), for example, as described above. According to various embodiments, the auction engine 118 may match bids to maximize auction volume, for example, as expressed by Equation (1):

$$\sum_n \sum_b |AwardP_{n,b} \times AwardQ_{n,b}| \qquad (1)$$

In Equation (1), n is the set of all contracts in the auction; b is the set of all bids that include a position in a contract n (including outright and non-outright bids); $AwardP_{n,b}$ is the auction price for the contract n, and $AwardQ_{n,b}$ is the number of contracts awarded for contract n from bid b.

The auction engine 118 may maximize Equation (1) subject to various constraints. For example, the sum of awarded positions in a contract may be set equal to zero (e.g., a zero-capacity contraint):

$$\sum_b AwardQ_{n,b} = 0 \qquad (2)$$

Also, the maximum price for a contract in an awarded bid may be set between zero and a maximum bid price. For example, Equation (3) expresses this condition for long bids and bid legs:

$$0 \leq AwardQ_{n,b} \leq BidQ_{n,b} \qquad (3)$$

In Equation (3), $BidQ_{n,b}$ may be the maximum bid quantity. Similarly, Equation (4) expresses this condition for short bids and bid legs:

$$0 \geq AwardQ_{n,b} \geq BidQ_{n,b} \qquad (4)$$

In addition to these conditions, the price of each awarded bid may be less than or equal to the highest bid prices. Equation (5) expresses this condition for outright bids:

$$AwardP_{n,b} \leq BidP_{n,b} \qquad (5)$$

In Equation (5), $BidP_{n,b}$ may be the maximum bid price. Similarly, Equation (6) expresses this condition for non-outright bids having multiple legs:

$$AwardTP_b \leq BidTP_b \qquad (6)$$

Here, $AwardTP_b$ may be the sum of the bid prices for all bids b on the contract n, as set forth in Equation (7):

$$AwardTP_b = \sum_n BidP_{n,b} \qquad (7)$$

In an alternative embodiment, the auction engine 118 may match bids to maximize economic surplus, for example, as expressed by Equation (8):

$$\sum_b |(BidP_b - AwardP_b) \times AwardQ_b| \qquad (8)$$

In Equation (8), b is the set of all bids that include a position in a contract; $AwardP_b$ is the auction price for the contract, and $AwardQ_b$ is the number of contracts awarded for the contract from bid b.

The auction engine 118 may maximize Equation (8) subject to various constraints. For example, the sum of awarded positions in a contract may be set equal to zero (e.g., a zero-capacity constraint):

$$\sum_b AwardQ_{n,b} = 0 \qquad (9)$$

The awarded quantity for a contract in an awarded bid may be set between zero and a maximum bid quantity. For example, Equation (10) expresses this condition for long bids and bid legs:

$$0 \leq AwardQ_{n,b} \leq BidQ_b \qquad (10)$$

In Equation (10), $BidQ_b$ may be the maximum bid quantity. Similarly, Equation (11) expresses this condition for short bids and bid legs:

$$-BidQ_b \leq AwardQ_{n,b} \leq 0 \qquad (11)$$

In addition to these conditions, the price of each awarded bid may be less than or equal to the bid prices. Equation (12) expresses this condition for outright bids:

for each bid with one long contract n: $AwardP_{n,b} \leq BidP_b$ for each bid with one short contract n: $AwardP_{n,b} \geq BidP_b \qquad (12)$ In Equation (12), $BidP_{n,b}$ may be the maximum bid price. Similarly, Equation (13) expresses this condition for non-outright bids having multiple legs:

$$AwardP_b \leq BidP_b \qquad (13)$$

Here, $AwardP_b$ may be the sum of the bid prices for all bids b on the contract n, as set forth in Equation (14):

$$AwardP_b \geq \sum_n AwardP_b - \sum_m AwardP_m \qquad (14)$$

Any suitable optimization algorithm may be used including, for example, a simplex algorithm. For example, a CPLEX optimization engine may be utilized. According to various embodiments, additional constraints may require that the matched bids meet all participant constraints.

Figure 4:
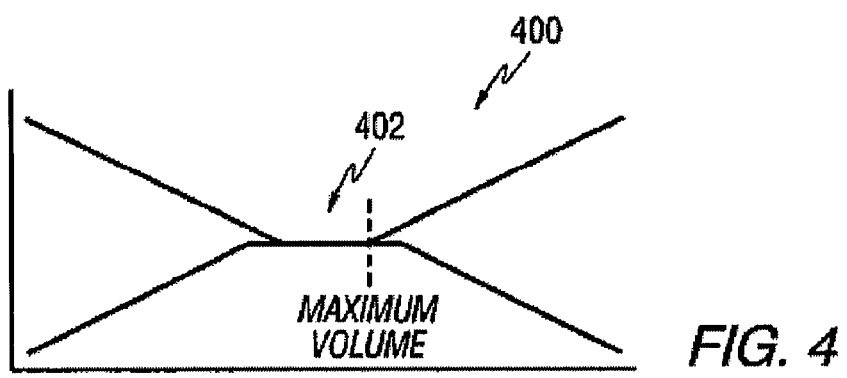
FIG. 4 illustrates one embodiment of a graph illustrating a degenerate volume solution for matching bids.
Figure 5:
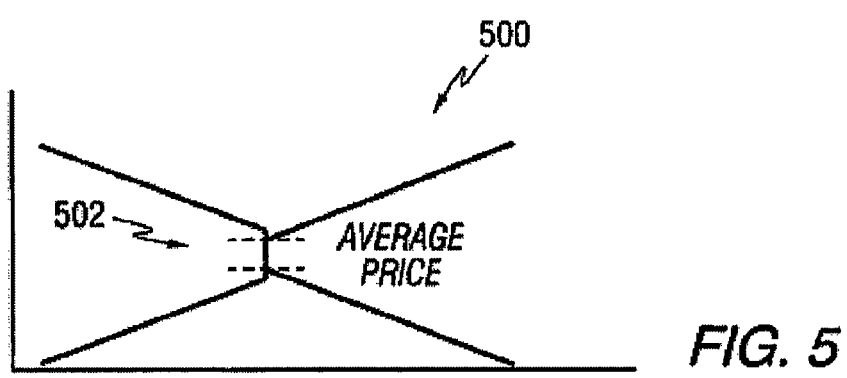
FIG. 5 illustrates one embodiment of a graph illustrating a degenerate price solution for matching bids.

FIG. 3, FIG. 4, and FIG. 5—Degenerate Solutions

At decision 304, the auction engine 118 may determine whether the optimization algorithm has resulted in any degenerate solutions. A degenerate solution may occur when there is more than one auction solution where a given auction variable is optimized, or where no solution if found. For example, FIG. 4 illustrates one embodiment of a graph 400 illustrating a degenerate volume solution for matching bids.

As shown in the graph 400, an optimal cleared volume may be achieved anywhere along a horizontal demand and supply curve portion 402. Also, FIG. 5 illustrates one embodiment of a graph 500 illustrating a degenerate price solution for matching bids. In the example shown by the graph 500, the optimal price may occur anywhere along a vertical portion 502 of the demand and supply curve.

Referring back to FIG. 3, any degenerate solutions may be resolved at box 306. For example, if a degenerate volume solutions exists, the auction engine 118 may select the solution having the maximal optimized cleared volume and/or auction revenue. Also, for example, if a degenerate price solution exists, the auction engine 118 may average the high and low values of the optimized values for price to select the price value to be used.

Price Islanding

At decision 308, the auction engine 118 may determine whether the optimization algorithm has resulted in any price islanding. Price islanding may occur when a cleared/matched set of non-outright bids for a given contract or contracts are not connected to the other contracts/bids by an outright bid or another constrained bid (e.g., a bid that depends on an outright position). This may result in a series of shadow prices for the islanded contracts that resolve to a range of possible prices. Any price islanding may be grounded at box 310, for example, by using previous-auction period (e.g., previous day, week, and the like) prices bound by the range of valid shadow prices for each contract.

FIG. 8—Orderly Reduction of Participant Exposure

The auction engine 118 may allow for the orderly reduction of a portfolio of the participant 102 when the portfolio exceeds a trade risk limit. FIG. 8 illustrates one embodiment of a process flow for implementing an auction of financially settled contracts utilizing the architecture shown in FIG. 1 including orderly reduction of participant exposure.

The auction engine 118 may receive prescreened bids 801 and existing participant portfolios 802 from all of the participants 102 in the auction. In blocks 803 and 804, the auction engine 118 may perform order matching and price and volume determinations on the prescreened bids 801, as in blocks 208 and 210 from FIG. 2. The matching and price and volume determinations may result in the initial awarded positions and prices 805, as generated by block 210.

In block 806, the existing participant portfolios 802 for each of the participants 102 may be checked to determine if any of the existing participant portfolios 802 are in violation of the trade risk limit for each of the existing participant portfolios 802. The trade risk limit may be a metric assigned to an existing participant portfolio 802 that can be compared with a quantifiable trade risk entailed by a portfolio. For example, if the trade risk of a portfolio is measured using Value-at-Risk (VAR) with a 5% probability of loss over a two-week period, the trade risk limit may be a VAR value based on the 5% and two-week parameters, such as, for example, $1,000,000. This exemplary VAR would indicate a trade risk limit of a 5% chance of losing $1,000,000 in value over a two-week period. If one of the participants 102 has an existing participant portfolio 802 that is already in violation of the trade risk limit, flow proceeds to block 807. Otherwise, flow proceeds to block 808.

For example, if an exemplary participant 102 has an existing participant portfolio 802 with a trade risk limit, measured in VAR, of a 5% chance of a $1,000,000 loss over two weeks, and the participant 102's existing participant portfolio 802 has a VAR of a 5% chance of a $1,500,000 loss over two weeks, the existing participant portfolio 802 is in violation of the trade risk limit.

In block 807, the auction engine 118 may attempt to reduce the exposure of the existing participant portfolio 802 for the participant 102 found to be violating the trade risk limit in block 806. The auction engine 118 may make changes to the initial awarded positions and prices 805, attempting to award bids from the participant 102 for positions that, when added to the existing participant portfolio 802, will lower the trade risk of the existing participant portfolio 802. The auction engine 118 may attempt to reduce the trade risk of the existing participant portfolio 802 to a level below the trade risk limit for the existing participant portfolio 802. For example, if the trade risk limit is a 5% chance of a $1,000,000 loss over two weeks, the trade risk of the existing participant portfolio 802 is a 5% chance of a $1,500,000 loss over two weeks, and awarding a specific subset of bids from the participant 102 for contracts A, B, and C will reduce the trade risk to a 5% chance of $975,000 loss over two weeks, the auction engine 118 may attempt to modify the initial awarded positions and prices 805 to award the participant 102 the subset of bids for the contracts A, B, and C, remedying the existing participant portfolio 802's violation of the trade risk limit.

In some instances, it may not be possible for the auction engine 118 to award bids that will reduce the trade risk of the participant 102's existing participant portfolio 802 below the trade risk limit. In these cases, the auction engine 118 may attempt to award bids from the participant 102 that will lower the trade risk of the existing participant portfolio 802 as much as possible. For example, if the trade risk limit is a 5% chance of a $1,000,000 loss over two weeks, the trade risk of the existing participant portfolio 802 is 5% chance of a $1,500,000 loss over two weeks, awarding a specific subset of bids for contracts A, B, and C from the participant 102 will reduce the trade risk to a 5% chance of $1,250,000 loss over two weeks, and there is no way to award bids from the participant 102 to reduce the trade risk any more, the auction engine 118 may attempt to modify the initial awarded positions and prices 805 to award the participant 102 the subset of bids for the contracts A, B, C, reducing the trade risk of existing participant portfolio 802. Any invalidations of specific trades in or changes made to the initial awarded positions and prices 805 may require an updated order set 809, causing the flow to proceed back to block 803, where the auction engine 118 may perform the order matching again.

In block 807, if the auction engine 118 does not make any changes to the initial awarded prices and positions 805 to produce the updated order set 809 because, for example, there are no changes that would reduce the existing participant portfolio 802's trade risk, flow proceeds to block 808. Otherwise, flow proceeds back to block 803, where the auction engine 118 may perform the order matching again, based on the updated order set 809.

In block 808, either none of the existing participant portfolios 802 of the participants 102 were found to be in violation of their trade risk limits, or the auction engine 118 determined there were no changes that could be made to the initial awarded positions and prices 805 to reduce the trade risk of the existing participant portfolios 802 of any of the participants 102 found to be violating trade risk limits. The initial awarded positions and prices 805 may be finalized, into the final awarded positions and prices 810.

By allowing the auction engine 118 to make adjustments to awarded bids for the participants 102, the trade risk of the participant 102's existing participant portfolios 802 may, when necessary, be reduced in an orderly manner. Further, this method of risk reduction may allow for the trade risk to be reduced without the need for any changes in behavior by the participants 102 or any sophisticated knowledge of trade risk, or even ability to calculate current and future trade risk, on the part of the participant 102. The participant 102 may submit bids as normal even if the existing participant portfolio 802 is in violation of the trade risk limit, and the auction engine 118 may take on the responsibility of reducing, or at least not increasing, trade risk.

FIG. 9—Orderly Liquidation

Under some circumstances, a portfolio, for example, a portfolio held by one of the participant's 102, may be in default and need to be liquidated. For example, the participant 102 may be bankrupt, necessitating the liquidation of the participant 102's portfolio to pay off creditors. The auction engine 118 may conduct the orderly liquidation of a defaulted portfolio, allowing for the assets in the defaulted portfolio to be auctioned off at a cost that is acceptable to a liquidation agent responsible for the liquidation.

The liquidation agent may use a Maximum Portfolio Liquidation Cost Constraint (MPLCC) to govern the liquidation of a defaulted portfolio by the auction engine 118. The MPLCC may be a value designating the maximum liquidation cost the liquidation agent is willing to incur to liquidate the default portfolio. Liquidation cost for a defaulted portfolio may be determined by summing, across all initial positions in the portfolio, the difference between the liquidation price (e.g., price the position will sell for in the liquidation auction) and the previous settlement price for a position multiplied by the size of the portfolio position. For example, if a defaulted portfolio is long 8 contracts of A which are liquidated at a price of 5 while their previous settlement mark was 10, and long 10 contracts of B which are liquidated at a price of 9 while their previous settlement mark was 12, the liquidation cost is $(8*(10-5))+(10*(12-9))=70$.

Alternatively, the liquidation cost for a defaulted portfolio may be determined by summing, across all liquidated positions in the portfolio, the difference between the liquidation price (e.g., price the position will sell for in the liquidation auction) and the previous settlement price for a position multiplied by the size of the portfolio position. In this alternative, only positions which are actually liquidated are used to measure the liquidation cost.

FIG. 9 illustrates one embodiment of a process flow for implementing an auction of financially settled contracts utilizing the architecture shown in FIG. 1 including orderly liquidation of a defaulted portfolio. In block 903, a liquidation agent may use liquidation tools to enter the defaulted portfolio offer set 901 into the auction. The default portfolio offer set 901 may be an order set offering a defaulting portfolio 902 for sale, either in whole or in parts. For example, the defaulted portfolio offer set 901 may offer the entire defaulting portfolio 902 at a "clear all" price, or subsets of the defaulting portfolio 902 may be offered in parcels at various prices, with the whole defaulted portfolio subject to the constraint of an MPLCC set by the liquidation agent.

The liquidation tools may allow the liquidation agent to create the defaulted portfolio offer set 901. The liquidation tools may be software, accessible by phone, email, web-based user input, electronic interfaces, and the like, which may be used to automatically create the defaulted portfolio offer set 901 for the defaulted portfolio 902 based on parameters provided by the liquidation agent. Parameters input to the liquidation tools may include, for example, offers placed for each element of the defaulted portfolio 902 at a certain percentage of the previous mark, or subsets of the defaulted portfolio 902 created by characteristic, for example, market, contract type, term, location type, and the like, offered at a certain percentage of the previous mark. Based on these parameters, the liquidation tools may create the defaulted portfolio offer set 901 to be entered into the auction to liquidate the defaulted portfolio 902.

Blocks 803, 804, 805 and 808 may operate in the same manner as described in FIG. 8. In block 806, if one of the participants 102 has an existing participant portfolio 802 that is already in violation of the trade risk limit, flow proceeds to block 904, instead of block 807. The defaulted portfolio 902 may have a trade risk limit of 0, which may require all assets held in the defaulted portfolio 902 be sold to place the defaulted portfolio 902 in compliance with the trade risk limit in block 806. This may cause the auction engine 118 to loop through blocks 803, 804, 806 and 807 until the risk of the defaulted portfolio 902 has been reduced to 0 (e.g., all assets of the defaulted portfolio 902 are part of awarded bids), or the risk cannot be reduced any further. In block 807, if the risk is not 0 but cannot be reduced any further, flow may proceed to block 904.

In block 904, the auction engine 118 may check the liquidation cost of the defaulted portfolio based on the initial awarded positions and prices 805 against the MPLCC provided by the liquidation agent. If the liquidation cost is higher than the MPLCC, flow proceeds to block 905. Otherwise flow proceeds to block 808.

In block 905, the auction engine 118 may perform liquidation cost optimization. The auction engine 118 may attempt to change the initial awarded positions and prices 805 to reduce the liquidation cost for the defaulted portfolio 902 so that it is equal to or lower than the MPLCC. If the auction engine 118 is able to make changes to the initial awarded positions and prices 805 that reduce the liquidation cost to equal to or under the MPLCC, flow proceeds back to block 803, where the updated order set 809 may be used by the auction engine 118 to match bids.

If in block 905 the auction engine 118 cannot make any changes to the initial awarded positions and prices 805 to reduce the liquidation cost, the auction engine 118 may perform optimization to determine optimal tradeoff between reduction of the trade risk of the defaulted portfolio 902 (e.g., through the sale of the assets in the portfolio) and liquidation cost. A preset function, set, for example, by the liquidation agent or set within the auction engine 118, may be used to determine the optimal tradeoff. For example, if the liquidation cost is calculated by summing, across all liquidated positions in the defaulted portfolio 902, the difference between the liquidation price and the previous settlement price for a position multiplied by the size of the portfolio position, the optimization of the tradeoff may be performed in three ways.

In the first optimization, the tradeoff may be optimized to maximize the economic surplus of the defaulted portfolio offer set 901. The offer prices may form a relative prioritization on the order set, and may signal a maximum liquidation cost for each element or subset of the defaulted portfolio 902. The MPLCC may still be the maximum liquidation cost for either the whole or subset of the defaulted portfolio 902.

In the second optimization, the tradeoff may be optimized to maximize the percentage of the total Megawatt hours (MWh) sold divided by the percentage of the MPLCC used, subject to the constraint that the percentage of the MPLCC used is at least a certain percentage, set, for example, by the liquidation agent or within the auction engine 118. The orders involving the largest MWh positions that are awarded with the lowest liquidation cost may be given the highest priority by the auction engine 118, so that the solution found may use the certain set percentage of MPLCC while achieving the greatest ratio of MWh reduction in the defaulted portfolio 902 to liquidation cost spent.

In the third optimization, the tradeoff may be optimized to maximize the percentage of total trade risk removed from the defaulted portfolio 902 divided by the percentage of the MPLCC used, subject to the constraint that the percentage of the MPLCC used is at least a certain, set, percentage. The orders involving the largest risk positions that are awarded with the lowest liquidation cost may be given higher priority by the action engine 118, so that the solution found may have spent at least the certain, set, percentage of the MPLCC while achieving the greatest ratio of trade risk reduction to liquidation cost spent.

Types of Contracts

The architecture 100 and trading platform 104 described above may be implemented in any market or exchange dealing in financially settled contracts. According to various embodiments, however, the architecture 100 may be implemented in a forward commodity market having a network of locationally defined, financially settled contracts. A locationally defined contract may be a contract whose underlying value is a commodity or other value described by a combination of commodity or value type (e.g., natural gas, crude oil, congestion, loss, and the like) and location. The dependence on location may allow locationally defined contracts to reflect variations in prices at different locations that arise because of constraints on the flow or transport of the commodity. For example, the price of natural gas may not be the same at all locations, at least in part because the layout and capacity of pipelines may limit the rate at which natural gas can be transferred between locations.

Participants in the physical commodities markets are exposed to risk from the volatility in price of the physical commodities at specific locations, and potentially from the volatility in price differentials between locations. These, participants may utilize a forward commodity market implementing the architecture 100 to hedge this risk. Because the architecture 100 may support a wide variety of non-outright bids varying over different commodities, settlement periods and locations, participants may be able to better tailor hedges to the risk of their physical positions. Also, participants with or without physical positions may be better able to pursue complex trading strategies and arbitrage opportunities. The increased liquidity brought about by the auction methods described and by speculative and arbitrage activity, may make it easier for physical position holders to obtain a desired hedge.

Electricity Markets

In another example embodiment, the architecture 100 and trading platform 104 may be implemented in an electricity forward market. An electricity forward market may be a financial forward market whose contracts settle on the electricity-related values at various locations or nodes in physical spot markets. For example, an electricity price contract may settle on an average electricity price at a location on the corresponding network (e.g., a region, hub or node) either during on-peak or off-peak hours over a specified settlement period (e.g., 1 day, 1 week, 2 months, 1 quarter, 1 year, and the like). A congestion contract may settle on the congestion at a given node. A loss contract may settle on the transmission loss between two nodes.

According to various embodiments, an electricity forward market implementing the architecture 100 may support nodal electricity forward contracts. Nodal electricity forward contracts may include contracts that settle on an average electricity price, congestion or loss at a node or nodes over a specified settlement period (e.g., during on-peak or off-peak hours). This may require the market to support a large number of contracts, and address associated liquidity challenges. For example, the number of nodes considered by an electricity forward market is limited only by the number of node locations on the corresponding spot market/grid. Some such grids may include several thousand nodes. Because each node may be the basis of multiple contracts (e.g., contracts for different classes, time periods, and the like), the total number of contracts traded in an electricity forward market may be quite large.

FIG. 6

Figure 6:
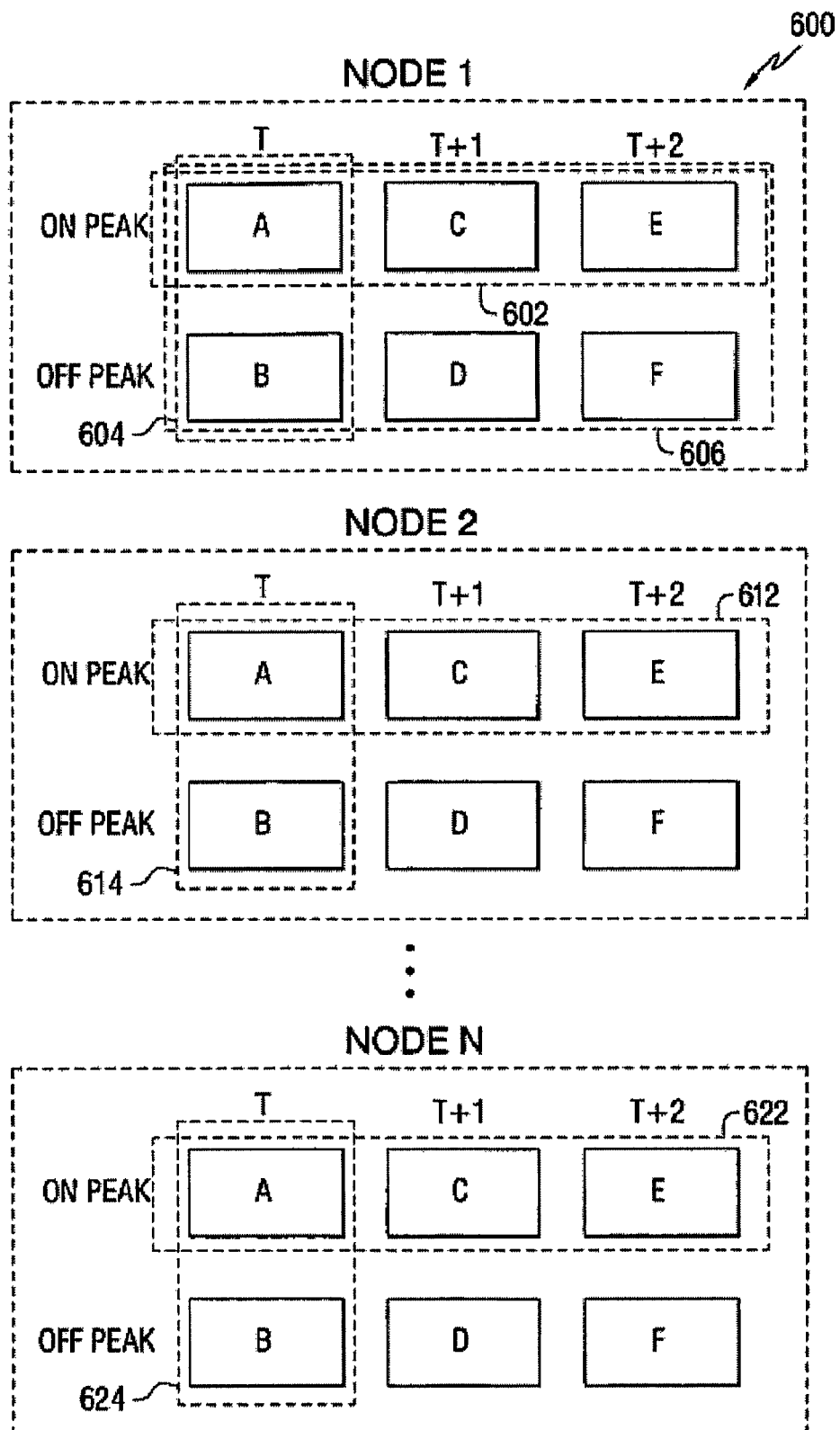
FIG. 6 illustrates one embodiment of a diagram showing example electricity forward contracts and various available bids that may be supported by the architecture of FIG. 1.

FIG. 6 illustrates one embodiment of a diagram 600 showing example electricity forward contracts and various available bids that may be supported by the architecture 100. The example forward electricity contracts may be, for example, electricity forward contracts settling on the price of electricity at a node, or congestion contracts. The diagram 600 shows example contracts that settle at one of the nodes 1, 2 . . . N. According to various embodiments, the number of nodes, N, may match the number of nodes in a corresponding electricity distribution grid. For each node, the diagram 600 illustrates six contracts, A, B, C, D, E, F over three time periods, T, T+1 and T+2. T may be any period of time including, for example, a day, a week, a month, or otherwise. Although only three time periods are illustrated, in practice, bids may be accepted for an arbitrary amount of time into the future. For example, according to various embodiments, the architecture 100 may accept bids for contracts that settle up to seventy-two months in the future. As shown in the diagram 600, the contracts may be divided into classes based on whether they settle during off-peak hours (B, D, F) or during on-peak hours (A, C, E). Contracts settling on other underlying values may also be divided into classes based on classifications of the underlying value.

The architecture 100 may support various outright and non-outright bids based on any combination of electricity forward contracts, such as those illustrated by the diagram 600. For example, for the forward electricity contracts shown in the diagram 600, three dimensions are shown: (i) a class dimension (e.g., on-peak versus off-peak); (ii) a settlement period dimension (e.g., T, T+1, T+2, and so forth); and (iii) a locational dimension (e.g., Nodes 1, 2 . . . N). Other market types may include more or fewer dimensions.

Allowable bids may vary across any dimensions. For example, a single period bid may be a straight outright bid for a long or short position in any of the contracts shown. A multi-period bid may be a non-outright bid including legs for contracts at a single location over multiple time periods. For example, box 602 illustrates a multi-period bid for on-peak contracts 1A, 1C and 1E at node 1 spanning the settlement periods T, T+1 and T+2. Multi-class bids may include legs for contracts at a single location across multiple classes. For example, Box 604 illustrates a multi-class bid for contracts settling at Node 1 over settlement period T across the on-peak and off-peak classes (e.g., 1A and 1B). A multi-period, multi-class bid may include legs for contracts at a single location across multiple classes and multiple settlement periods. An example of such a bid 606 may include legs for contracts 1A, 1B, 1C, 1D, 1E and 1F at node 1. As another example, Box 612 illustrates a multi-period bid for on-peak contracts 2A, 2C and 2E at node 2 spanning the settlement periods T, T+1 and T+2. As another example, Box 614 illustrates a multi-class bid for contracts settling at Node 2 over settlement period T across the on-peak and off peak classes (e.g., 2A and 2B). As another example, Box 622 illustrates a multi-period bid for on-peak contracts NA, NC and NE at node N spanning the settlement periods T, T+1 and T+2. As another example, Box 624 illustrates a multi-class bid for contracts settling at Node N over settlement period T across the on-peak and off peak classes (e.g., NA and NB).

Various non-outright bids may include matched or unmatched positions varying across the class, settlement period and locational dimensions. For example, some non-outright bids may comprise a first leg or legs taking a short position in a first contract or contracts and a second leg or legs taking a long position in a second contract or contracts. The number of short and long legs may, but need not match.

Also, a locational non-outright bid may include legs taking positions across two locations (e.g., nodes) for any settlement period or class. An example locational non-outright bid may include legs for contracts 1A and 2A. A temporal non-outright bid may include legs taking positions across two settlement periods, which may or may not be contiguous. An example temporal non-outright bid may include a leg for a long position in contract 1A and a leg for a short position in contract 1C. A locational, temporal non-outright bid may comprise legs taking positions across two locations and two settlement periods. An example locational, temporal bid may comprise a long leg on contract 1A and a short leg on contract 2C. Other example non-outright bids may include variations of the class dimension including, for example, inter-class bids, locational inter-class bids, temporal inter-class bids, locational, temporal inter-class bids, and the like.

Bids may also vary across different types of underlying values (e.g., electricity price, congestion, loss, and the like). According to various embodiments, positions in one contract type may be expressed synthetically in terms of positions in other contract types. For example, a loss position may be expressed as a spread between a price position and a congestion position. This may allow various embodiments of the trading platform 104 to accept and award bids on certain contract types, without actually having the underlying contract available. Also, this may allow bids for positions in one type of contract (or combination of contracts) to be matched with bids for positions in other types of contracts (or combination of contracts).

FIG. 7

Figure 7:
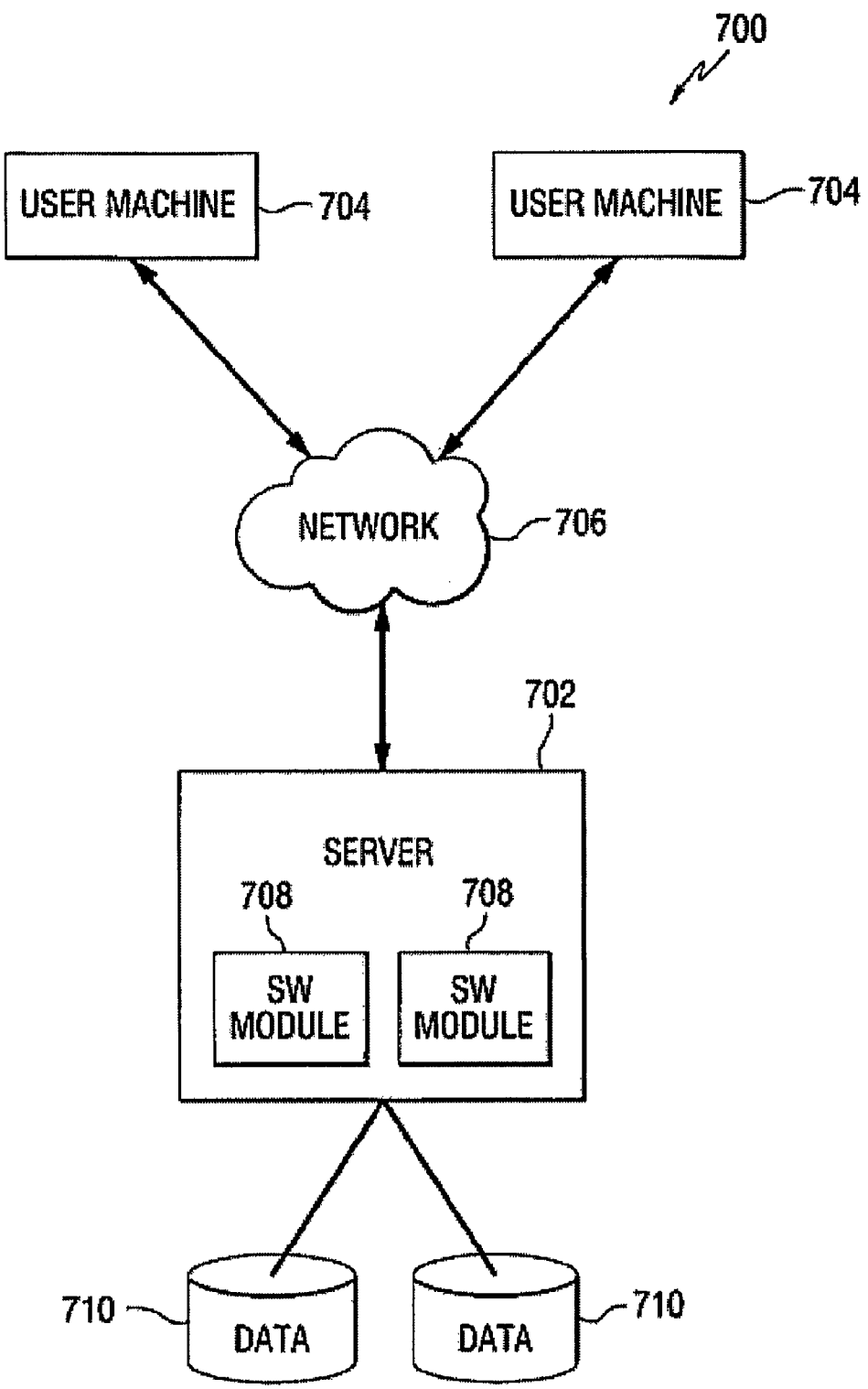
FIG. 7 illustrates one embodiment of a computer system for implementing the architecture of FIG. 1.

FIG. 7 illustrates one embodiment of a computer system 700 for implementing the architecture 100. The system 700 may include one or more servers 702. The one or more servers 702 may include a processor or processors configured to execute one or more software modules 708. Each software module 708 may implement all or a part of a functional component of the architecture 100. For example, one of the software modules 708 may implement all or a portion of auction engine 118 and/or the trade capture system 120 and/or the trade platform 104, the interfaces 112, 114, 116. Data necessary or useful for implementing the architecture 100 may be stored at one or more databases 710. Also, one or more user machines 704 may be in communication with the server 702 via a network 706. The network 706 may be any kind of suitable wired or wireless network. User machines 704 may be used, for example, by participants 102, brokers 110, the clearing corporation 106 and/or clearing members 108 to access the functionality implemented by the server 702. According to various embodiments one or more of the participants 102, brokers 110, clearing corporation 106 and/or clearing members 108 may implement the automated interface 112, 114, and 116 to the sever 702, allowing bids to be submitted and trades to be executed without human intervention.

It is to be understood that the figures and descriptions of the present invention have been simplified to illustrate elements that are relevant for a clear understanding of the present invention, while eliminating, for purposes of clarity, other elements, such as, for example, some specific tasks of the non-execution service provider units described above, and the like. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system" or "programmable device" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers, computer systems and programmable devices disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable memory media.

Various modules and components of the architecture 100 and/or the system 700 may be implemented as software code to be executed by a processor(s) of any computer system using any type of suitable computer instruction type. The software code may be stored as a series of instructions or commands on a computer readable memory medium. The term "computer-readable memory medium" as used herein may include, for example, magnetic and optical memory devices such as diskettes, compact discs of both read-only and writeable varieties, optical disk drives, and hard disk drives. A computer-readable memory medium may also include memory storage that can be physical, virtual, permanent, temporary, semi-permanent and/or semi-temporary.

We claim:

1. A computer system for conducting an auction for a plurality of financially settled contracts, the system comprising:
   means for receiving a plurality of first participant bids from a first participant;
   means for receiving a plurality of second participant bids from a second participant; and
   means for matching a batch of bids to create a plurality of awarded bids, wherein the batch of bids comprises the plurality of first participant bids and the plurality of second participant bids, wherein each bid of the batch of bids relates to at least a portion of the plurality of financially settled contracts, wherein the matching comprises matching an outright bid with at least one leg of at least one non-outright bid, and wherein the first participant has a portfolio, and if the portfolio has a trade risk in violation of a trade risk limit, the plurality of awarded bids are modified to award the first participant bids that reduce or do not increase the trade risk of portfolio.

2. The system of claim 1, wherein the awarded bids reduce the trade risk of the portfolio to below the trade risk limit.

3. The system of claim 1, wherein the reduction of the trade risk of the portfolio is maximized through matching of the first participant bids.

4. The system of claim 1, further comprising:
means for receiving a first participant constraint;
means for generating a preliminary awarded portfolio for the first participant, wherein the preliminary awarded portfolio comprises at least one awarded bid selected from the plurality of first participant bids; and
means for, if the preliminary awarded portfolio does not meet the first participant constraint, discarding a portion of the plurality of first participant bids.

5. The system of claim 4, wherein the portion of the plurality of bids is selected considering at least one factor selected from the group consisting of a bid priority received from the first participant; and the first participant's economic surplus.

6. The system of claim 4, wherein the first participant constraint is at least one constraint selected from the group consisting of a trade limit and a collateral limit.

7. The system of claim 1, wherein the plurality of awarded bids comprises an equal volume of long bids and short bids for each of the plurality of financially settled contracts with at least one set of awarded bids.

8. The system of claim 1, wherein matching the batch of bids comprises maximizing:

$$\sum_n \sum_b |AwardP_{n,b} \times AwardQ_{n,b}|.$$

9. The system of claim 8, wherein the maximizing comprises maximizing according to the constraint that $$\sum_b AwardQ_{n,b} = 0.$$

10. The system of claim 8, wherein the maximizing comprises maximizing according to the constraints that:

$0 \leq AwardQ_{n,b} \leq BidQ_{n,b}$;

$0 \geq AwardQ_{n,b} \geq BidQ_{n,b}$;

$AwardP_{n,b} \leq BidP_{n,b}$; and $AwardTP_b \leq BidTP_b$.

11. The system of claim 1, further comprising means for deriving a price for all of the plurality of financially settled contracts.

12. The system of claim 1, further comprising means for deriving a price for a contract selected from the plurality of financially settled contracts, wherein the contract has no awarded bids in the plurality of awarded bids.

13. The system of claim 12, wherein deriving the price comprises setting the price to a mid-point between a lowest short bid and a highest long bid for the contract selected from the batch of bids.

14. The system of claim 12, wherein deriving the price comprises modifying a price for the contract from a previous auction by an amount proportional to a price change of a second contract correlated to the first contract.

15. The system of claim 1, further comprising means for publishing at least a portion of un-awarded bids from the batch of bids to at least one broker.

16. The system of claim 1, wherein the matching comprises resolving at least one degenerate solution selected from the group consisting of a degenerate price solution and a degenerate volume solution.

17. The system of claim 1, wherein the plurality of financially settled contracts each settle on the price of a commodity type at a location over a settlement period.

18. The system of claim 1, wherein the plurality of contracts comprises at least one contract selected from the group consisting of an electricity contract, a congestion contract and a loss contract.

19. The system of claim 1, wherein the at least one non-outright bid comprises a non-outright bid comprising a first leg and a second leg, and wherein the first leg and the second leg relate to underlying contracts settling on the price of different underlying values at different locations over different settlement periods.

20. The system of claim 1, wherein the batch of bids comprises at least one bid type selected from the group consisting of: a spread bid, a strip bid, a spread of spreads bid, a single period bid, a multi-period bid, a non-contiguous multi-period bid, a proportional bid, a multi-class bid, a multi-period/multi-class bid, a locational bid, a temporal bid, a locational/temporal bid.

21. The system of claim 1, wherein the plurality of financially settled contracts comprises at least one contract selected from the group consisting of an oil contract, a coal contract, a natural gas contract, an electricity contract, a weather contract, a weather-related events contract, a commodities contract, a passenger contract, a freight contract, and a financially settled derivative contract of any underlying commodity or security.

22. The system of claim 1, wherein the matching further comprises matching at least one bid with a synthetic equivalent.

23. A computer system for conducting an auction for a plurality of financially settled forward electricity contracts corresponding to a first spot market, the computer system comprising:
A computer memory, and
A programmable processor in electronic communication with the memory, the processor configured to generate awarded bids by matching bids selected from a batch of bids received from a plurality of participants, wherein each bid selected from the batch of bids relates to at least a portion of the plurality of financially settled contracts, wherein the matching comprises matching an outright bid selected from the batch of bids with at least one leg of at least one non-outright bid selected from the batch of bids, wherein the plurality of financially settled forward electricity contracts comprises a plurality of nodal contracts, and wherein the plurality of participants have portfolios, and if one of the participant's portfolios has a trade risk in violation of a trade risk limit, the awarded bids are modified to award the participant bids that reduce or do not increase the trade risk of the participant's portfolio.

24. The computer system of claim 23, wherein the awarded bids reduce the trade risk of the portfolio to below the trade risk limit.

25. The computer system of claim 23, wherein the reduction of the trade risk of the portfolio is maximized through matching of the participant bids.

26. The computer system of claim 23, wherein the trade risk is measured using Value at Risk (VAR).

27. A system for conducting an auction for a plurality of financially settled forward electricity contracts corresponding to a first spot market, the system comprising:
means for receiving a plurality of first participant bids from a first participant;

means for receiving a plurality of second participant bids from a second participant; and match a batch of bids to create a plurality of awarded bids, wherein the batch of bids comprises the plurality of first participant bids and the plurality of second participant bids, wherein each bid of the batch of bids relates to at least a portion of the plurality of financially settled contracts, wherein the matching comprises matching an outright bid with at least one leg of at least one non-outright bid, wherein the plurality of financially settled forward electricity contracts comprises a plurality of nodal contracts, and wherein the first participant has a portfolio, and if the portfolio has a trade risk in violation of a trade risk limit, the plurality of awarded bids are modified to award the first participant bids that reduce or do not increase the trade risk of the portfolio.

28. A computer system for conducting an auction for a plurality of financially settled contracts, the system comprising:

means for receiving a plurality of first participant bids from a first participant;

means for receiving a plurality of second participant bids from a second participant; and means for matching a batch of bids to create a plurality of awarded bids, wherein the batch of bids comprises the plurality of first participant bids and the plurality of second participant bids, wherein each bid of the batch of bids relates to at least a portion of the plurality of financially settled contracts, wherein the matching comprises matching an outright bid with at least one leg of at least one non-outright bid, and wherein at least a portion of the plurality of financially settled contracts are in a defaulted portfolio, and wherein the plurality of awarded bids are modified to liquidate the defaulted portfolio for a liquidation cost less than or equal to a Maximum Portfolio Liquidation Cost Constraint.

29. The system of claim 28, wherein the Maximum Portfolio Liquidation Cost Constraint is set by a liquidation agent.

30. The system of claim 28, wherein the liquidation cost is calculated by summing, across all initial positions in the defaulted portfolio, the difference between a liquidation price and a previous settlement price for a position multiplied by the size of the position in the defaulted portfolio.

31. The system of claim 28, wherein the liquidation cost is calculated by summing, across all liquidated positions in the defaulted portfolio, the difference between a liquidation price and a previous settlement price for a position multiplied by the size of the position in the defaulted portfolio.

32. The system of claim 28, wherein, if the defaulted portfolio cannot be liquidated with the liquidation cost under Maximum Portfolio Liquidation Cost Constraint, the awarded bids are modified to optimize the tradeoff between the liquidation cost and the liquidation of the defaulted portfolio.

33. The system of claim 32, wherein the tradeoff between the liquidation cost and the liquidation of the defaulted portfolio maximizes the economic surplus of a defaulted portfolio offer set.

34. The system of claim 32, wherein the tradeoff between the liquidation cost and the liquidation of the defaulted portfolio maximizes the percentage of total Megawatt hours (MWh) sold divided by a percentage of the Maximum Portfolio Liquidation Cost Constraint used, subject to the constraint that the percentage of the Maximum Portfolio Liquidation Cost Constraint used is at least a certain set percentage.

35. The system of claim 32, wherein the tradeoff between the liquidation cost and the liquidation of the defaulted portfolio maximizes a percentage of total risk removed from the defaulted portfolio divided by a percentage of the Maximum Portfolio Liquidation Cost Constraint used, subject to the constraint that the percentage of the Maximum Portfolio Liquidation Cost Constraint used is at least a certain set percentage.

* * * * *